(12) United States Patent
Kan

(10) Patent No.: US 9,395,933 B2
(45) Date of Patent: Jul. 19, 2016

(54) DISTRIBUTED STORAGE SYSTEM, DISTRIBUTED STORAGE METHOD, AND PROGRAM AND STORAGE NODE FOR DISTRIBUTED STORAGE

(75) Inventor: Masaki Kan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1059 days.

(21) Appl. No.: 13/393,207

(22) PCT Filed: Sep. 1, 2010

(86) PCT No.: PCT/JP2010/064912
§ 371 (c)(1),
(2), (4) Date: Feb. 28, 2012

(87) PCT Pub. No.: WO2011/027775
PCT Pub. Date: Mar. 10, 2011

(65) Prior Publication Data
US 2012/0159102 A1 Jun. 21, 2012

(30) Foreign Application Priority Data
Sep. 1, 2009 (JP) ................................. 2009-202061

(51) Int. Cl.
*G06F 3/06* (2006.01)
*H04L 29/08* (2006.01)
*G06F 11/10* (2006.01)

(52) U.S. Cl.
CPC ............... *G06F 3/065* (2013.01); *G06F 3/067* (2013.01); *G06F 3/0613* (2013.01); *G06F 3/0617* (2013.01); *G06F 3/0619* (2013.01); *G06F 3/0625* (2013.01); *H04L 67/1065* (2013.01); *H04L 67/1076* (2013.01);

(Continued)

(58) Field of Classification Search
CPC ..... G06F 3/065; G06F 3/0617; G06F 3/0619; G06F 3/0613; G06F 3/0625; G06F 3/067; G06F 11/1076; G06F 2213/0038; G06F 3/06; G06F 11/10; H04L 67/1076; H04L 67/1065; H04L 29/08; Y02B 60/1246
See application file for complete search history.

(56) References Cited

U.S. PATENT DOCUMENTS

| 7,773,609 B2 | 8/2010 | Kobara |
| 2007/0282915 A1 | 12/2007 | Vosshall et al. |
| 2009/0154476 A1 | 6/2009 | Kobara |

FOREIGN PATENT DOCUMENTS

| JP | 2009-147649 A | 7/2009 |
| WO | WO 2008/024850 A2 | 2/2008 |

OTHER PUBLICATIONS

Tom Kleinpeter, "Programmer's Toolbox Part 3: Consistent Hashing", Mar. 17, 2008, pp. 1-8, http://www.tomkleinpeter.com/2008/03/17/programmers-toolbox-part-3-consistent-hashing/.*

(Continued)

*Primary Examiner* — Christopher D Birkhimer
(74) *Attorney, Agent, or Firm* — McGinn IP Law Group, PLLC

(57) ABSTRACT

Storage nodes participating in the distributed storage system are divided into groups beforehand. A data replica creation unit operates so that a replica is created on each of the nodes participating in the distributed storage system on a hash ring. A unit that specifies an operating state of the system determines the number of data replicas for each group. The data replica creation unit traverses the hash ring and creates one or more replicas until it is determined that the number of replicas for each group is reached.

11 Claims, 7 Drawing Sheets

(52) U.S. Cl.
CPC .... *G06F 11/1076* (2013.01); *G06F 2213/0038* (2013.01); *Y02B 60/1246* (2013.01)

(56) References Cited

OTHER PUBLICATIONS

International Search Report in PCT/JP2010/064912 dated Dec. 7, 2010(English Translation Thereof).
David Karger, Eric Lehman, Tom Leighton, Matthew Levine, Daniel Lewin, Rina Panigrahy, "Consistent hashing and random trees: Distributed caching protocols for relieving hot spots on the World Wide Wet", In ACM Symposium on Theory of Computing, 1997.
Tom White's Blog: Consistent Hashing, http://weblogs.java.net/blog/tomwhite/archive/2007/11/consistent_hash.html, accessed on Feb. 27, 2009.
Giuseppe DeCandia, Deniz Hastorun, Madan Jampani, Gunavardhan Kakulapati, Avinash Lakshman, Alex Pilchin, Swaminathan Silvasubramanian, Peter Vosshall and Werner Vogels, "Dynamo: Amazon's Highly Available Key-Value Store", in the Proceedings of the 21st ACM Symposium on Operating Systems Principles, Stevenson, WA, Oct. 2007.

* cited by examiner

DISTRIBUTED STORAGE SYSTEM, DISTRIBUTED STORAGE METHOD, AND PROGRAM AND STORAGE NODE FOR DISTRIBUTED STORAGE

TECHNICAL FIELD

Reference to Related Application

This application is based upon and claims the benefit of the priority of Japanese patent application No. 2009-202061 filed on Sep. 1, 2009 the disclosure of which is incorporated herein in its entirety by reference thereto.

The present invention relates to a distributed storage system, a distributed storage method, and a program and a storage node for distributed storage.

BACKGROUND

<Consistent Hash Method>

In recent years, there have been increasing attempts to implement a distributed storage system, more specifically, a storage system having scalable performance by distributing and arranging data using a hash function. As a method of distributing and arranging data using the hash function, there is used a consistent hash method (described in each of Non-patent Documents 1 and 2), for example.

In the consistent hash method, data is distributed and arranged in a plurality of storage apparatuses (for which computer apparatuses such as IA servers (servers, each of which has one or more Intel's microprocessors mounted), each constituted from a CPU and a memory, are applicable). In a system to which the consistent hash method is applied, there is provided a distributed hash table or the like.

The reason why the consistent hash method as described above is used as the distributing and arranging method is as follows.

Even if a storage apparatus is added or deleted, there is no need to rearrange the distribution of whole data again in order to maintain a distributed and recorded state of the data.

Further, even if a fault occurs in one of the plurality of storage apparatuses, restoration can be flexibly performed.

Non-patent Document 3 discloses an example of the distributed storage system in which data is arranged in a distributed manner, using the consistent hash method. FIG. 1 is a citation of FIG. 2 of Non-patent Document 3 without alteration.

The distributed storage system disclosed in Non-patent Document 3 generally operates as follows. According to Non-patent Document 3, a node (Node) that stores data whose key (Key) is K (the hash value of data is K when Key is to be found by the hash value) is determined as a node B, using the consistent hash method. This is because the node B is a first node when the hash ring is traversed in a clockwise direction from the position of K. A storage apparatus constituting the distributed storage system may fail. Thus, preferably, data is stored in different storage apparatus, as well. In the distributed storage system in Non-patent Document 3, the data having the key value of K is stored in three storage apparatuses and hence the data having the key value of K is stored in nodes C and D as well, by further traversing the hash ring from the node B in the clockwise direction. Keys located in the range between the nodes A and B are stored in the nodes B, C, and D.

The configuration method of the distributed storage system using the hash function as described above is not only used for storing master data, as described in Non-patent Document 3, but also is used as a mechanism for storing a cache (temporary data that may be) of the master data. In this case, the distributed storage system operates in such a manner that the master data is recorded in a different storage system (such as a database system), and a client who will read the data accesses the distributed storage system for the cache, without accessing the storage system of the master data.

[Non-patent Document 1]
David Karger, Eric Lehman, Tom Leighton, Matthew Levine, Daniel Lewin, Rina Panigrahy, "Consistent hashing and random trees: Distributed caching protocols for relieving hot spots on the World Wide Web", In ACM Symposium on Theory of Computing, 1997

[Non-patent Document 2]
Tom White's Blog: Consistent Hashing, http://weblogs.java.net/blog/tomwhite/archive/2007/11/consistent_hash.html, accessed on Feb. 27,2009

[Non-patent Document 3]
Giuseppe DeCandia, Deniz Hastorun, Madan Jampani, Gunavardhan Kakulapati, Avinash Lakshman, Alex Pilchin, Swaminathan Silvasubramanian, Peter Vosshall and Werner Vogels, "Dynamo: Amazon's Highly Available Key-Value Store", in the Proceedings of the 21st ACM Symposium on Operating Systems Principles, Stevenson, WA, Oct. 2007.

SUMMARY

The entire disclosure of each of Non-patent Documents listed above is incorporated herein by reference.

Analyses of the related arts by the present invention will be given below.

<Function Demanded for Distributed Storage System>

In recent years, the increase in power consumption of an IT system that is installed in a data center or the like has become an issue. An IT system is demanded which can control power consumption in view of an electricity charge, an influence on an earth's environment, or the like. In order to control power consumption in a distributed storage system, it is necessary to flexibly stop or operate a storage apparatus constituting the distributed storage system according to a performance and/or a function needed by the <Issues of Distributed Storage System Using Consistent Hash Method>

In the distributed storage system, however, there is a problem that a large number of storage apparatuses cannot be substantially simultaneously or immediately (all at once) stopped.

The reason for that problem is the following. When a large number of the storage apparatuses (also termed as "storage nodes") such as a half of the number of the storage apparatuses constituting the system are immediately stopped, for example, some data become unable to be accessed. Further, even if the data is in a state capable of being accessed after the large number of the storage apparatuses have been stopped, availability and performance demanded for the system may not be satisfied.

That is, when a specific one of the storage apparatuses is stopped in the distributed storage system using the consistent hash method, data movement and/or data rearrangement is performed in order to maintain a data redundancy level and load distribution.

Assume that replicas of data are created using the rule as shown in FIG. 1, for example. When a fault occurs in the node B and the node B is then removed from the ring in this case, the data having the key=K is recorded only in the nodes C and D.

In this case, since the data is recorded only in the two nodes C and D, the redundancy level of the data decreases from that in the initial state (before occurrence of the fault in the node B where the node B is connected and the ring and the replicas of the data are held in the three nodes B, C, and D). For that reason, there is a possibility that removal the node B may deteriorate availability and read performance.

Then, order to maintain the state where three replicas of the data are held, the system operates so that the data having the key=K is replicated in a node E located next to the node D in the clockwise direction.

As described above, when the node B is removed from the ring, the data having the key of K is replicated in the node E located next to the node D in the clockwise direction. Deterioration of availability and read performance is thereby avoided, so that no big issue arises.

However, as described above, it may be necessary to stop simultaneously a half of the number of operating nodes in the distributed storage system may in order to save power of the system. Assume that the nodes B, C, and D are stopped when the number of the operating nodes in the distributed storage system is halved in FIG. 1, for example.

Then, all the nodes storing the data having the key=K with redundancy are stopped. As a result, the data having the key=K cannot be accessed.

When a client accesses the data having the key=K, the data cannot be accessed unless one of the nodes B, C, and D is resumed. Resumption of the node leads to an increase in power consumption, this being an issue in implementing power saving.

Further, even if all of the nodes storing data with redundancy have not been stopped, replication of a large volume of data will occur among a remainder of the operating nodes in order to maintain the redundancy level of the data when approximately a half or 90% of the operating nodes are simultaneously stopped. For this reason, availability and performance of data access will deteriorate.

Accordingly, an object of the present invention is to provide a distributed storage system, a distributed storage method, and a program and a storage for distributed storage configured so that a plurality of storage apparatuses constituting the distributed storage system can be simultaneously stopped.

Another object of the present invention is to provide a distributed storage system, a distributed storage method, and a program and a storage node for distributed storage configured so that the above-mentioned object of the present invention is achieved and predetermined availability and performance of data continues to be maintained even if a plurality of storage apparatuses are stopped.

According to the present invention, there is provided a distributed storage system comprising:

a unit that specifies an operating state of the system; and
a data replica creation unit; wherein the unit that specifics an operating state of the system divides a plurality of storage nodes participating in the distributed storage system into a plurality of groups, respectively corresponding to operating states of the system; and the data replica creation unit creates one or ore data replicas corresponding to the number of data replicas specified for each of the groups of the storage nodes participating in the distributed storage system.

According to the present invention, there is provided a distributed storage method comprising:

dividing plurality of storage participating in a distributed storage system a plurality of groups respectively corresponding to operating states of the system; and the storage node that receives a data write request, creating one or more data replicas corresponding to the number of data replicas specified for each of the groups of the plurality of storage nodes participating in the distributed storage system.

According to the present invention, there is provided a program for causing a computer comprising a storage node to execute a process that specifies an operating state of a distributed storage system and a data replica creation process, wherein the process that specifies an operating state of the system divides a plurality of storage nodes participating in the distributed storage system into a plurality of groups respectively corresponding to operating states of the system; and the data replica creation process creates one or more data replicas corresponding to the number of data replicas specified for each of the groups of the storage nodes participating in the distributed storage system. The program may be stored in a storage medium such as a ROM (read only memory), a flash memory (Electrically Erasable and Programmable ROM), a magnetic disk, a hard disk, a digital versatile disk, a compact disk or the like.

According to the present invention, there is provided a storage node forming a distributed storage system in which a plurality of storage nodes participating in the distributed storage system are divided into a plurality of groups respectively corresponding to operating states of the system, and one or more data replicas are created corresponding to the number of data replicas specified for each of the groups of the plurality of storage nodes participating in the distributed storage system, the storage node comprising:

a data replica creation means that traverses a hash ring having the storage nodes logically arranged thereon, searches one or more replication destinations until the number of data replicas specified for each group is attained, and creates a list of one or more of the storage nodes of the replication destinations.

According to the present invention, there is provided a storage node forming a distributed storage system in which a plurality of storage nodes participating in the distributed storage system are divided into groups respectively corresponding to operating states of the system, and one or more data replicas are created corresponding to the number of data replicas specified for each of the groups of the storage nodes participating in the distributed storage system, wherein the storage node traverses a hash ring having the storage nodes logically arranged thereon, and issues a replication instruction to an adjacent storage node on the hash ring corresponding to the group to which the storage node belongs; and checks whether the number of one or more of the storage nodes of one or more replication destinations reaches the number of data replicas specified for the group, the storage node issues the replication instruction to a further adjacent storage node on the hash ring corresponding to the group, in case the number of the one or more of the storage nodes of the one or more replication destinations does not reach the number of data replicas specified for the group, and the storage node finishes a replication process in case the number of the one or more of the storage nodes of the one or more replication destinations reaches the number of data replicas specified for the group.

According to the present invention, a plurality of the storage apparatuses comprising the distributed storage system can be simultaneously stopped. Further, according to the present invention, even if a plurality of the storage apparatuses are stopped, predetermined availability and performance of data can be continued to be maintained.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

<Basic Principle of Invention>

Figure 1:
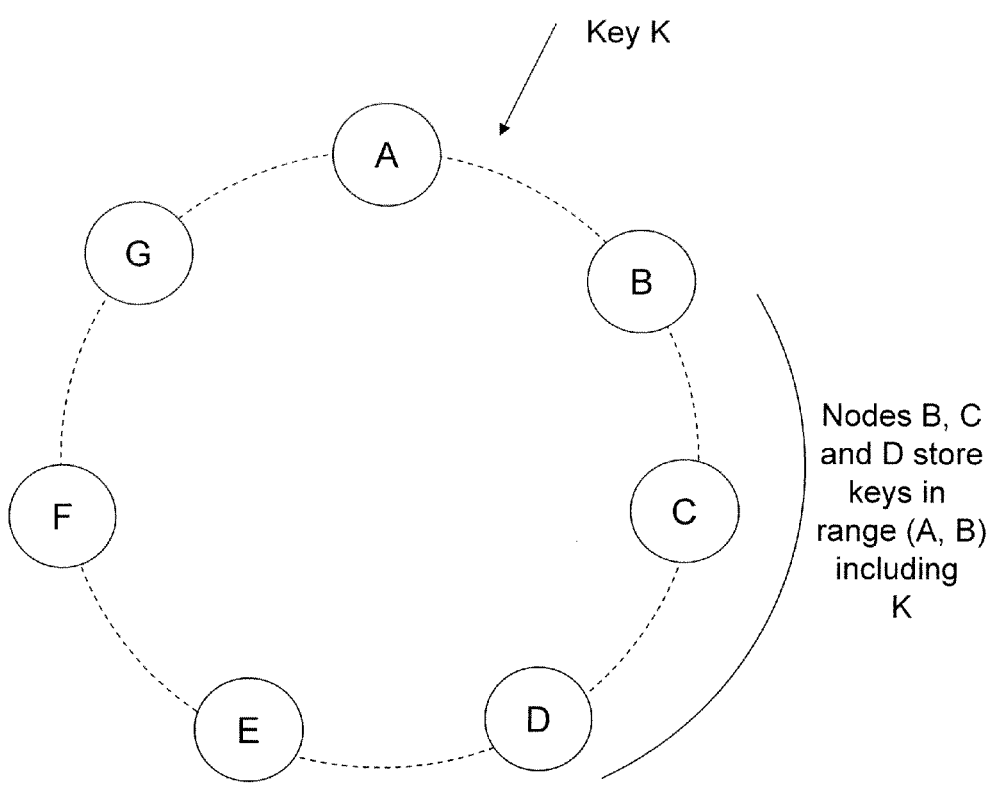
FIG. 1 is a diagram cited from FIG. 2 of Non-patent Document 3 and showing a method of replicating data in a distributed storage system using a consistent hashing method.

A distributed storage system according t0 the present invention comprises means that defines an operating state of the system and means that creates a data replica. A plurality of storage nodes (storage apparatuses) participating in the distributed storage system are divided into groups beforehand. Then, the data replica creation means creates one or more data replicas, corresponding to each of the groups of the storage nodes of the distributed storage system.

In the present invention, the means that defines an operating state sets the number of one or more data replicas corresponding to each of the groups. The data replica creation means traces a hash ring on which the storage nodes are arranged, and creates the one or more data replicas until the number of one or more replicas for each group is attained.

As mentioned above, according to the present invention, the storage nodes participating in the distributed storage system are divided into groups respectively corresponding to operating states of the system, and data is replicated and held so that the defined number of one or more data replicas is satisfied for each group. Predetermined availability and performance of data can be thereby continued to be maintained in the distributed storage system, even if a plurality of the storage nodes are simultaneously stopped.

According to the present invention, since a plurality of the storage nodes can be stopped simultaneously in the distribution storage system, switching control such as halving the current number of operating storage nodes can be performed according to a load or a service, when operating a large-scale distributed system. With this arrangement, a power-saving distributed storage system can be implemented. Further, even if the number of the storage nodes operating in the system has been reduced in precedence of power saving in the distributed storage system, a data redundancy level (number of replicas) can be maintained. Predetermined availability and read performance of data can be ensured.

The reason why the data redundancy level (number of replicas) can be maintained in the present invention is that the number of data replicas is specified for each group corresponding to the state of the system, and one or more replication destinations are determined on the hash ring. When writing data, the hash ring on which the storage nodes are logically arranged is traversed in a clockwise direction, for example, to obtain one of the nodes adjacent to a current one of the storage nodes. Then, it is identified to which one of the groups the adjacent node belongs. When the specified number of one or more replicas has not been reached for the identified group, the adjacent node is determined as the replication destination corresponding to the identified group. When one or more replication destinations satisfying the number of the one or more replicas specified in advance have been detected for each of the groups to which the storage node on the hash ring belongs, the replica of the data is created for each of the one or more replication destinations determined corresponding to each of the groups.

In the present invention, basic effects of a consistent hashing method can be continued to be held. The basic effects are as follows:

random load distribution can be performed;

rearrangement of data is not necessary when a fault node is removed: and node addition and/or removal can be performed with a small amount of replicas of the data.

Next, exemplary embodiments of the present invention will be described in detail with reference to drawings.

<Exemplary Embodiments>

Figure 2:
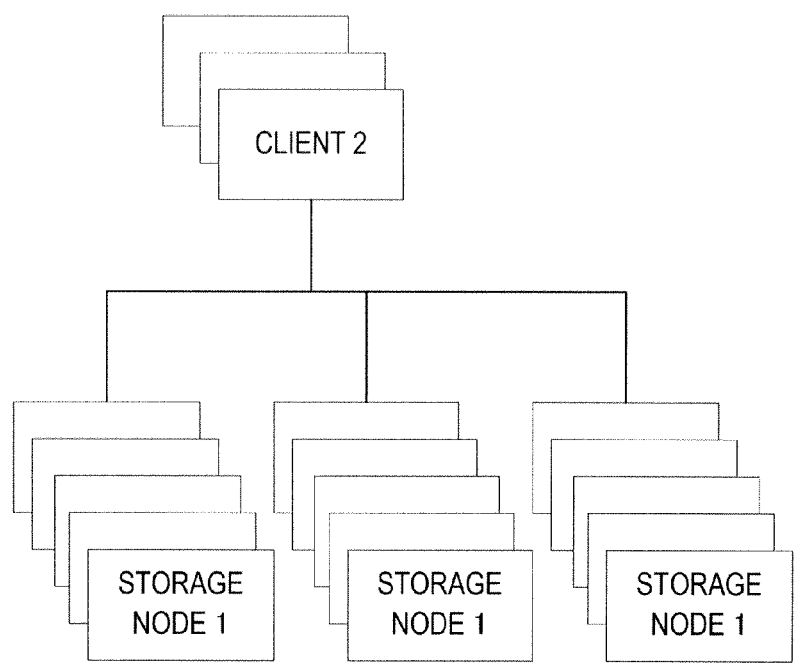
FIG. 2 is a diagram showing a configuration of an exemplary embodiment of the present invention.

Referring to FIG. 2, a first exemplary embodiment of the present invention includes an arbitrary number of storage nodes 1 and an arbitrary number of clients 2. The storage nodes 1 and the clients 2 are connected through a network apparatus. In a distributed storage system, each storage node 1 is a node (computer) in which data is stored, and each client 2 is a node (computer) which performs data access to the distributed storage system. A network may includes an arbitrary communication network apparatus using a LAN (Local Area Network), a WAN (Wide Area Network), a packet network or a circuit-switched network, a dedicated line, or, wireless communication or wired communication.

Each storage node 1 includes a computer (server) that comprises an operation apparatus such as a processor, a storage apparatus such as a semiconductor memory or a magnetic recording apparatus, a network connection apparatus, and the like. Likewise, each client 2 includes a computer (server) including an operation apparatus such as a processor and a network connection apparatus.

Figure 3:
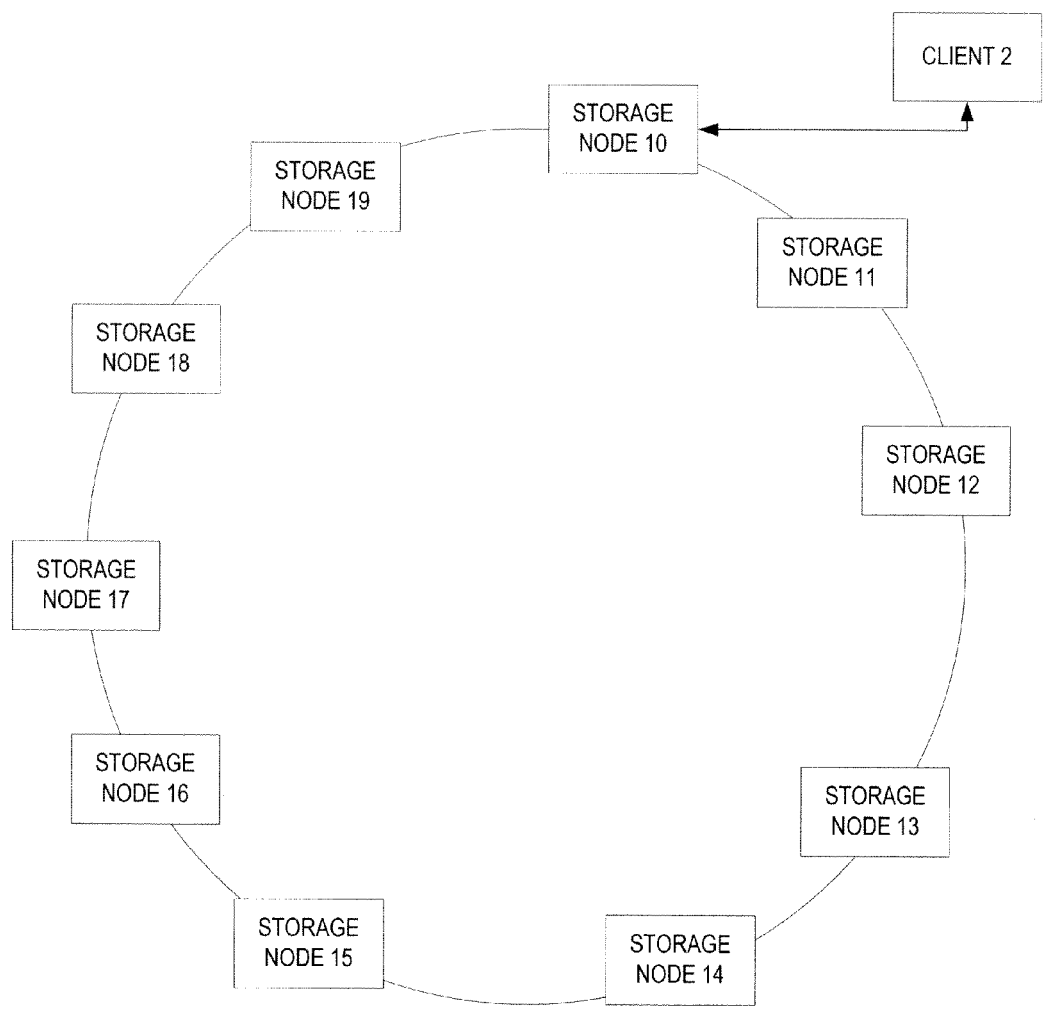
FIG. 3 is a diagram showing a configuration of the exemplary embodiment of the present invention.

The distributed storage system in this exemplary embodiment holds a ring structure logically (does not need to be physically a ring structure), as shown in FIG. 3. Storage nodes 10 to 19 are nodes that constitute the distributed storage system.

When accessing data, the client 2 makes data access to a storage node derived by a consistent hash method. With respect to data (object) between the storage, node 19 and the storage node 10 in a hash space, for example, the client 2 accesses the storage node 10 (storage node on a hash ring that closest in a clockwise direction of the hash ring) (for reading and writing).

<Configurations of Client and Storage Node>

Figure 4:
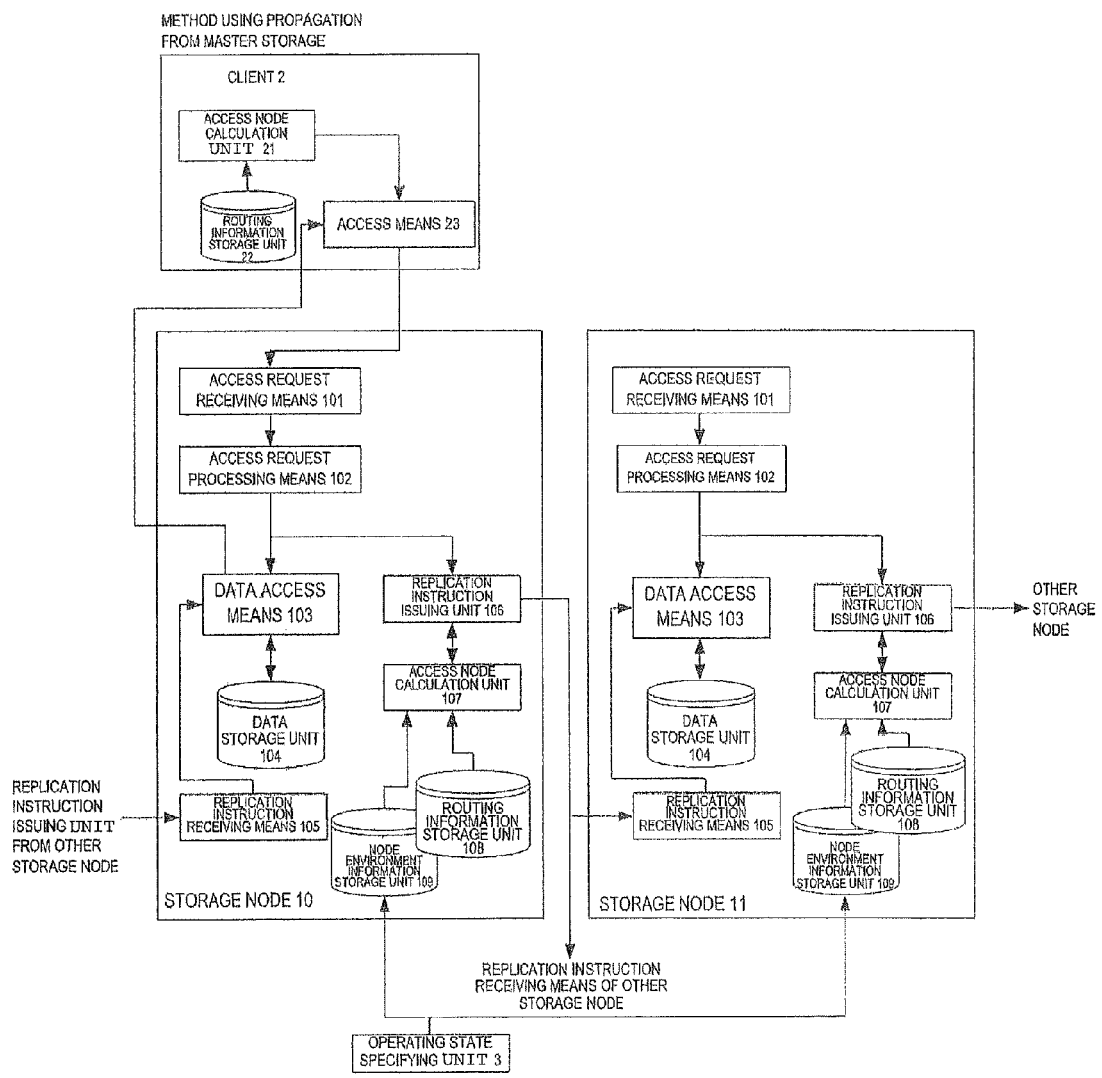
FIG. 4 is a diagram showing an example of configurations of a client and storage nodes in the exemplary embodiment of the present invention.

FIG. 4 is a diagram showing configurations of the client and the storage nodes in this exemplary embodiment. In FIG. 4, there is provided the client 2, the storage nodes 10 to 11, and operating state specifying unit (means) 3. Though FIG. 4 shows one client and two storage nodes for briefness, the numbers of these apparatuses are arbitrary.

The storage nodes 10 to 11 are set to have the same configuration. The storage node 10 includes access request receiving means 101, access request processing means 102, data access means 103, a data storage unit 104, replication instruction receiving means 105, replication instruction issuing unit (means) 106, access node calculation unit (means) 107, a routing information storage unit 108, and a node environment information storage unit 109. Each of these means generally operates as follows.

The access request receiving means 101 receives an access request from the client 2, and passes the received access request to the access request processing means 102.

The access request processing means 102 interprets the access request and passes the access request to the data access means 103. The access request processing means 102 requests the replication instruction issuing means 106 to issue an instruction of performing a replication process when it is necessary to create a replica after a result of interpreting the access request.

The data access means 103 performs a data reading process from the data storage unit 104 and performs a data writing process on the data storage unit 104.

The data access means 103 receives the access request from the client 2 through the access request receiving means 101 and the access request processing means 102, performs the process according to the access request, and makes a response to the client 2.

The data access means 103 creates a replica of data for the data storage unit 104, when the replication instruction receiving means 105 receives a replication instruction from the replication instruction issuing means 106 of a different storage node.

The data storage unit 104 is a storage apparatus that stores data of the distributed storage system. The data storage unit 104 is implemented by a magnetic storage apparatus such as a semiconductor memory or an HDD (hard disk drive).

The replication instruction receiving means 105 receives the replication instruction from the replication instruction issuing means 106 of another storage node, and then requests the data access means 103 to perform the process.

The replication instruction issuing means 106 receives the access request from the access request processing means 102, issues the replication instruction to the storage node of a replication destination, and then transfers necessary replicated data. Information on the storage node of the replication destination is obtained by a request to the access node calculation means 107 made by replication instruction issuing means 106.

The access node calculation means 107 finds storage nodes of the replication destination. Calculation of the storage node of the replication destination is generally performed as follows.

(A) The access node calculation means 107 finds an adjacent one of the storage nodes, on the hash ring, using information stored in the routing information storage unit 108 of the replication destination and a hash function.

(B) Next, the access node calculation means 107 determines whether or not the adjacent storage node is a replication destination, using information stored in the node environment storage unit 109.

(C) The access node calculation means 107 calculates a further one of the storage nodes adjacent to the adjacent node, and determines whether or not the calculated one further adjacent to the adjacent node is the replication destination. The access node calculation means 107 repeats the processes (A) to (C).

The access node calculation means 107 repeats the processes (A), (B), and (C) until a specified value of the number of replicas of data recorded in the node environment information storage unit 109 is attained, thereby determining the node of the replication destination. This process procedure will be described later, with reference to FIG. 7.

The routing information storage unit 108 stores the information necessary for routing of data arrangement. Specifically, names of the storage nodes and information that is necessary and sufficient for accessing (such as IP addresses and port numbers) are stored and held. The type of the hash function, an algorithm, a program, and the like constituting the hash ring are also recorded and held in the routing information storage unit 108. When the information necessary for routing data arrangement is incorporated into the program of the access node calculation means 107, these information do not need to be stored in the routing information storage unit 108.

Information on a group to which each storage node belongs and a redundancy level (number-of-Replicas) set for each group are recorded and held in the node environment information storage unit 109. The information on the group to which each storage node belongs may be recorded in the routing information storage unit 108 as well. To take an example, it may be so arranged that the group to which each storage node belongs is identified according to the name of the storage node.

The client 2 includes access node calculation means 21, a routing information storage unit 22, and access means 23.

The access node calculation means 21 is means for calculating one of the storage nodes of an access destination for arbitrary data when the client 2 accesses the arbitrary data. Basically, the access node calculation means 21 has the same function as the access node calculation means 107 in each storage node, and calculates the storage node of the access destination, using information stored in the routing information storage unit 22 and the hash function.

The routing information storage unit 22 stores the information necessary for routing of data arrangement. Specifically, the names of the storage nodes and information that is necessary and sufficient for accessing (such as the IP addresses and the port numbers) are stored and held. Basically, the routing information storage unit 22 has an equivalent function to the routing information storage unit 108.

The access means 23 in the client makes access to data in the distributed storage system. The access means 23 issues an access request to one of the storage nodes calculated by the access node calculation means 21, and receives a result of the access for the access request from the storage node.

The operating state specifying means 3 specifies an operating state of the overall system. In the example shown in FIG. 4, the operating state specifying means 3 is shown as an element different from the client 2 and each of the storage nodes 10 to 19, for explanation purpose. The operating state specifying means 3 may also be physically implemented by software (computer program) that operates on an arbitrary one of the client 2 and the storage nodes 10 to 19.

<Operating State of System>

Table 1 listed below shows examples of operating state information of the overall system as operating states of the overall system in the distributed storage system.

TABLE 1

| state | number of nodes | redundancy level |
|---|---|---|
| A | maximum use: 1000 nodes | 6 |
| B | standard use: 500 nodes | 4 |
| C | power-saving use: 100 nodes | 2 |

The distributed storage system in this example is constituted from 1000 storage nodes. Then, in state A (for maximum use), all of the 1000 nodes are used to operate the distributed storage system. In state B (for standard use), 500 nodes, which are a half of the number of the 1000 nodes, are operated. Then, in state C (for power-saving use), 100 nodes among the 1000 nodes are operated.

In the state A, the system is operated so that data is replicated in six nodes. In the state B, the system is operated so that data is replicated in four nodes. In the state C, the system is operated so data is replicated in two nodes. The "redundancy level" in Table 1 corresponds to the number of data replicas for a group corresponding to each state.

The distributed storage system in this exemplary embodiment operates while ensuring availability defined for each operating state, even if the state is changed over, such as from A to B or from B to C.

Each storage node constituting the distributed storage system belongs to one of groups (one of group A, group B, and group C) indicating each state.

<Storage Node Set>

If a set of nodes which operates in a state X are expressed as Nodes (X), the following relationship holds with respect to Table 1:

Nodes $(A) \supset$ Nodes $(B) \supset$ Nodes $(C)$

That is, the storage node set (group) of a state A includes the storage node set (group) of a state B. The storage node set (group) of a state B includes the storage node set (group) of a state C.

The storage node that operates in state C operates in state A (operating state in which all the nodes of the distributed storage system operate) as well.

The operating state specifying means 3 in this exemplary embodiment gives an instruction of changing over the operating state of the system. It is assumed that operating state information on each state (configuration content of each of the states A, B, and C) is specified beforehand. It is further assumed that to which group each storage node belongs is predetermined. The operating state specifying means 3, however, may change the operating state information and the configuration of each storage node and the like. To take an example, the operating state specifying means 3 may rewrite information on the redundancy level of the operating state information in the node environment information storage unit 109 of each storage node. Then, data may be replicated in or deleted from each storage node, based on the change in the redundancy level.

The operating state specifying means 3 may similarly change the group to which each storage node belongs or may change the number of the storage nodes constituted in each operating state. These changes, however, are not directly related to the subject of the present invention. Thus, description of these changes will be omitted.

The operating state specifying means 3 updates (instructs to change) the node environment information storage unit 109 of each storage node, according to a change in the state. To take an example, the operating state specifying means 3 changes state A in Table 1, in which the system has been so far operated, to state B, as a current state. In this case, 500 number of nodes, which are a half of the number of 1000 nodes, are operated at the redundancy level of 4 (number of data replicas).

Further, the operating state specifying means 3 may issue an instruction of stopping the storage node (Node (A∩not (B)∩not (C)) that belongs to the group A, but does not belong to either of the group B or the group C, if necessary. Each storage node stops the system thereof according to the stopping instruction.

<Explanation of Operations>

Figure 5:
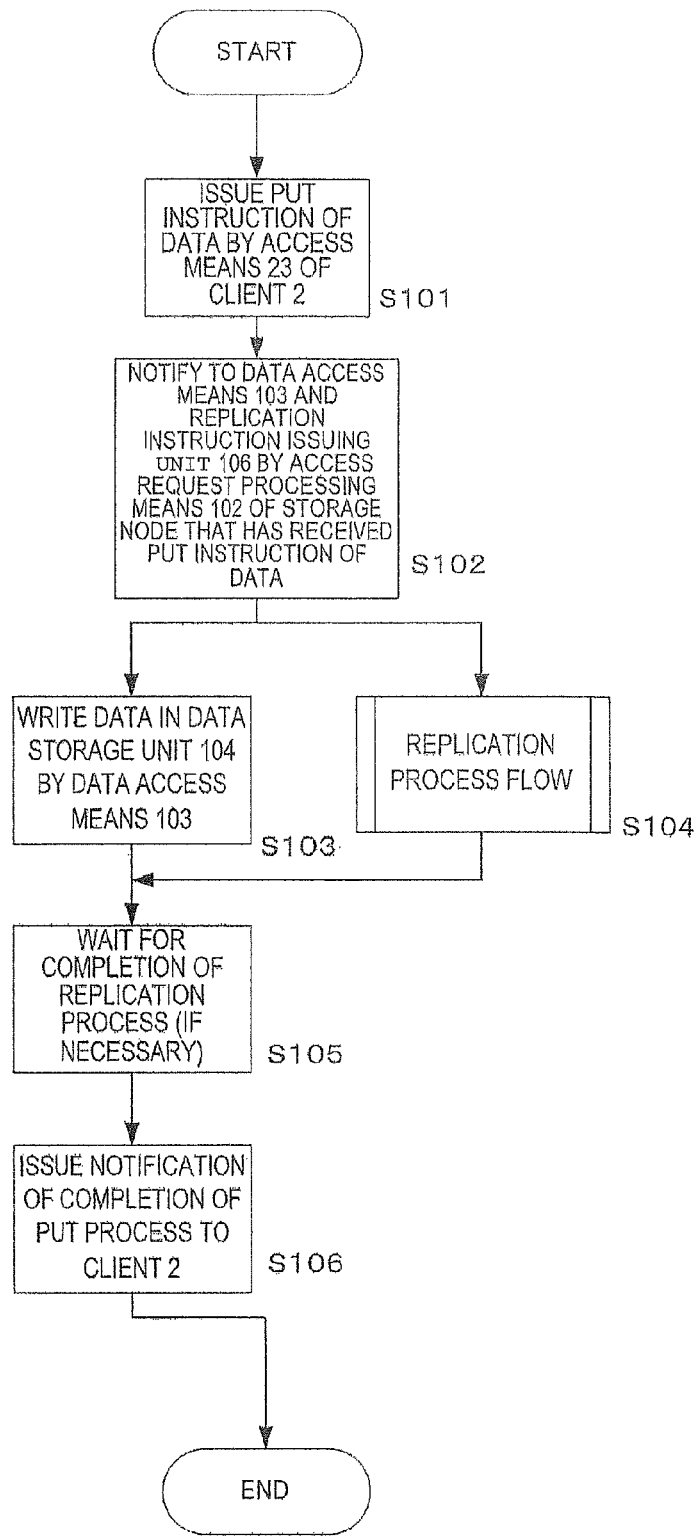
FIG. 5 is a flow diagram explaining an overall operation of a PUT process in the exemplary embodiment of the present invention.
Figure 6:
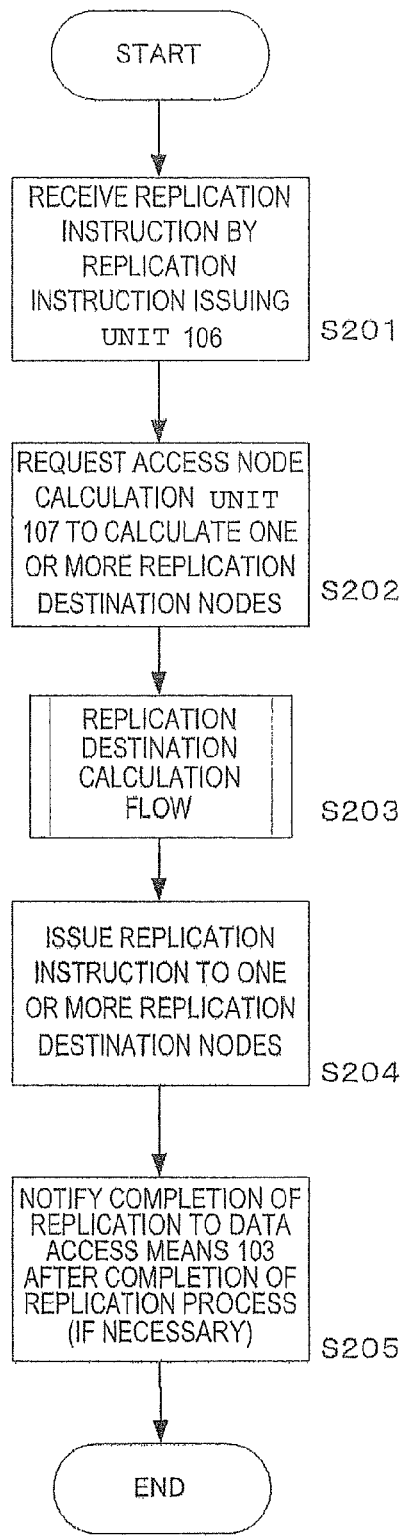
FIG. 6 is a flow diagram explaining operations of a replication process in the exemplary embodiment of the present invention.
Figure 7:
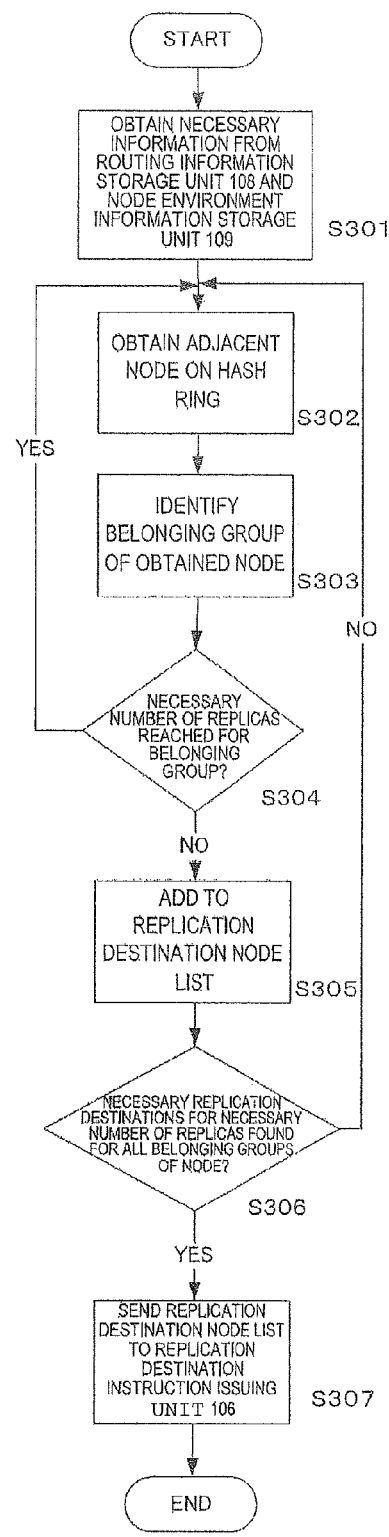
FIG. 7 is a flow diagram explaining a replication destination calculation procedure in the exemplary embodiment of the present invention.

The following describes an operation example of this exemplary embodiment, using flowcharts in FIGS. 5, 6, and 7.

An operation of accessing data in the distributed storage system will be described. A Write process (PUT process of data) in this exemplary embodiment is different from that in a common storage system. Thus, the description will be directed to this Write process. Since a Read process is similar to that in a distributed storage system using a common consistent hashing method, description of the Read process will be omitted.

<PUT Process>

FIG. 5 is a flowchart showing an overall procedure of the PUT process of data in this exemplary embodiment.

First, the access means 23 of the client 2 issues a PUT instruction of data to the storage node of an access destination among the storage nodes constituting the distributed storage system (in step S101 in FIG. 5).

The storage node which is a destination of the PUT instruction issued by the client 2 is determined according to the key of the data to be PUT. The storage node which is a destination of the PUT instruction is calculated by the access node calculation means 21 in the client 2. Though no particular limitation is imposed, the ring is traversed in the clockwise direction, based on the hash value of the Key value of the data, and the storage node that is first reached is determined as the destination node to which the PUT instruction is issued (the consistent hash method). The Key value of the data may be determined using an arbitrary method. In this exemplary embodiment, the Key value of the data is determined by an application of the client 2 that uses the distributed storage system, or by a hash value of data content or the like.

Next, the access request processing means 102 of the storage node that receives the PUT instruction of the data from the client 2 receives an access request (PUT instruction) from the access request receiving means 101, interprets this PUT instruction, and passes this PUT instruction to the data access means 103 and the replication instruction issuing means 106 (in step S102).

After step S102 in FIG. 5, the operation branches to a data access process in step S103 and a replication process flow in step S104. The steps S103 and S104 may be concurrently executed.

In the data access process to be subsequently performed, the data access means 103 performs a data writing process on the data storage unit 104 according to the PUT instruction (in step S103).

The replication instruction issuing means 106 asks a replication process for a different one of the storage nodes (in step S104). This replication process flow will be described in detail later.

Then, following step S103, completion of the replication process is waited (waited) for, if necessary (in step S105).

The wait process in step S105 depends on an operation policy of the distributed storage system, such as:

(a) responding to the client 2 after completion of the replication process of the data on the different storage node; or (b) responding to the client 2, when writing of the data to the data storage unit 104 of the storage node itself (that has received the PUT instruction of the data from the client 2) has been completed.

The storage system in this exemplary embodiment may follow one of the operation policies. Step S105 is executed as necessary. Thus, depending on the policy, step S105 may be omitted.

The storage node that has received the PUT instruction of the data from the client 2 issues a notification of completion of the PUT process to the client 2 (in step S106).

<Replication Process>

FIG. 6 is a flow diagram (flowchart) showing a processing procedure replication process in step S104 in FIG. 5.

First, the replication instruction issuing means 106 in the storage node (that has received the PUT instruction of the data from the client 2) receives a replication process instruction of the PUT instruction from the access request processing means 102 (in step S201 in FIG. 6).

Next, the replication instruction issuing means 106 requests the access node calculation means 107 to calculate information on one or more replication destination nodes (in step S202).

The access node calculation means 107 calculates the one or more replication destination nodes, and passes a list of the one or more replication destination nodes (replication destination node list) to the replication instruction issuing means 106 (in step S203). Calculation about the listed replication destination nodes by the access node calculation means 107 will be described later.

Next, the replication instruction issuing means 106 issues the replication instruction to the listed replication destination nodes that have been calculated (in step S204).

As a method of issuing the replication instruction, various methods are used including the following methods:

Multicasting the replication instruction to the listed replication destination nodes; or Issuing the replication instruction to an arbitrary number of the storage nodes among the listed replication destination nodes, for propagation.

Then, finally, a notification of completion of replication is issued to the data access means 103, after completion of the replication process has been waited for, if necessary (in step S205).

Step S205 is a step that is executed according to the operation policy of the distributed storage system, as described with respect to step S105 in FIG. 5. The completion of the replication process may be waited for. Alternatively, the PUT process may be completed without waiting for the completion of the replication process.

<Replication Destination Calculation Procedure for Each Group>

FIG. 7 is a flow diagram showing a replication destination calculation procedure in a replication destination calculation flow in FIG. 6 (in step S203).

The access node calculation means 107 of the storage node obtains the routing information from the routing information storage unit 108 and state information from the node environment information storage unit 109 (in step S301 in FIG. 7). The routing information is herein information such as the names of the storage nodes for determining the hash values of the storage nodes and information (IP addresses, port numbers, and the like) for accessing the nodes.

The node state information includes information on the operating state of the system (such as operating state A or B) and information on the number of data replicas (redundancy level) for each state.

Next, using the hash ring configured with the use of the routing information, one storage node adjacent to a current one of the storage nodes or an initial one of the storage nodes (storage node that has received the PUT instruction of the data from the client 2) in the clockwise direction of the hash ring is obtained (in step S302).

One of the storage nodes on the hash ring adjacent to the current node in a counter-clockwise direction of the hash ring may be of course calculated. The hash ring may be used any number of times as long as the configuration of the storage node that participates in the distributed storage system is not changed. For this reason, the hash ring may be created previously by the access node calculation means 107 (in this case, the process in step S301 is skipped).

Next, the group to which the obtained adjacent storage node belongs is identified (in step S303). When identifying the group to which the storage node belongs, it may be so arranged that information for identifying the group (e.g., a management table for managing information indicating that the storage node 11 belongs to the group C or the like) is held in the node environment information storage unit 109, and the belonging group of the storage node is identified using the node environment information storage unit 109. Alternatively, it may be so arranged that the group can be identified by the name of the storage node. To take an example, assuming that the name of the storage node 11 is set to "11C", and the end of the name is set to the name of the group "C", the group to which the storage node 11 belongs is identified as C.

Next, it is determined whether or not the number of one or more replication destination nodes of the belonging group has reached the number of data replicas (indicated by the redundancy level in Table 1) that is specified corresponding to the belonging group (in step S304). The belonging group in step S304 corresponds to the belonging group of the adjacent storage node identified in step S303.

When it is determined as a result of the determination in step S304 that the number of the one or more replication destination nodes of the belonging group has reached the number of data replicas specified corresponding to the belonging group, the operation proceeds to step S302. In that case, the adjacent storage node obtained in the step S302 of the preceding calculation is updated to a current storage node, and then an adjacent storage node of the current storage node is obtained.

On the other hand, when it is determined that the number of the one or more replication destination nodes in the replication destination node list has not reached the number of data replicas specified corresponding to the belonging group, the adjacent storage node obtained in step S302 is added to the replication destination node list (in step S305). As a result of this arrangement, the number of the nodes in the replication destination node list is added by one. The replication destination node list is reset to null before reading the replication destination calculation flow (in step S203) in FIG. 6, for example.

Next, in step S306, it is checked whether or not replication destinations for storing the necessary numbers of replicas have been found for all the belonging groups of the adjacent storage node. When it is determined that the replication destinations for storing the necessary numbers of replicas have not been found for all the belonging groups of the adjacent storage node, the operation returns to step S302. In that case, the adjacent storage node obtained in the step S302 of the preceding calculation is updated to the current storage node, and a next adjacent node on the hash ring is traversed.

When it is determined as a result of the determination in step S306 that the replication destinations for storing the necessary numbers of replicas have been found for all the belonging groups of the adjacent node, a replication destination node list is sent to the replication instruction issuing means 106 (in step S307).

The following described the operation with reference to the hash ring in FIG. 3. The initial current storage node is the storage node that has received the PUT instruction of the data from the client 2. The adjacent storage node 11 is obtained in step S302. The group to which the adjacent storage node 11 belongs is identified as C in step S303. It is determined in step S304 that the number of one or more replication destination nodes is currently zero (in a reset state where the replication destination node list is reset to null), and has not reached the number of replicas of two specified corresponding to the belonging group C. Accordingly, the adjacent storage node 11 is added to the replication destination node list in step S305. It is determined in step S306 that replication destinations for storing the necessary numbers of replicas have not been found for all the belonging groups of the adjacent storage node 11. As a result, the process in step S302 is executed again. In step S302, the adjacent storage node 11 (in FIG. 3) is set to a current storage node, and the storage node 12 (in FIG. 3) located adjacent to the current storage node in the clockwise direction is obtained as an adjacent storage node. It is assumed herein that in step S303, the group to which the adjacent storage node 12 belongs is determined as C. In the determination in step S304, the number of one or more replication destination nodes of the belonging group C is one, and has not reached the number of replicas of two specified corresponding to the belonging group C. Thus, the adjacent storage node 12 is added to the replication destination node list in step S305.

As a result of this arrangement, the number of the nodes related to the belonging group C becomes two in the replication destination node list. Then, it is determined as a result of the determination in step S306 that the replication destinations for storing the necessary number of replicas for the belonging group C have been found, but replication destinations for storing the necessary numbers of replicas have not been found for the other belonging groups. For this reason, the operation returns to the process in step S302 again. Then, the adjacent storage node 12 (in FIG. 3) is set to a current storage node, and the storage node 13 (in FIG. 3) located adjacent to the current storage node in the clockwise direction is obtained as an adjacent storage node.

Assume that the adjacent node obtained in step S302 belongs to the group C. Then, it is determined in step S304 that the belonging group C has reached the necessary number of replicas. Thus, the operation returns to step S302, where the adjacent storage node is set to a current storage node, and a next adjacent storage node is obtained. When this adjacent storage node belongs to the group B, for example, the processes in steps S304, S305, S306, S302, and S302 are repeated. The node is added to the replicated node list, and replication destinations corresponding to the number of replicas of four specified by the belonging group B is ensured, in the same way as in the case of the belonging group C.

Referring to Table 1, each storage node that operates in the state C operates in the state A as well, as described before. That is, each storage node of the group C belongs to the group A as well. For this reason, the hash ring (whose number of nodes is 100) is traversed. After the replication destinations for the number of replicas of two are determined for the group C, the processes in steps S302 to S306 are further repeated. Then, four replication destinations are added to the replication destination node list, thereby determining a total of six replication destinations. In this case, the necessary number of replicas has been found for the belonging groups A and C.

When it is determined in step S306 that the necessary numbers of replicas have been found for all of the belonging groups of the node on the hash ring, a replication destination storage node list is sent to the replication instruction issuing means 106 (in step S307).

Assume that a current storage node that provides basis for determining an adjacent node returns to a first one of the storage nodes (or search of the adjacent one of the storage nodes on the hash ring comes full circle on the hash ring), in the process of obtaining the adjacent node on the hash ring in step S302 in the flowchart in FIG. 7. Then, depending on the implementation of the distributed storage system, the operation may transition to step S307.

The replication instruction issuing means 106 issues the replication instruction to the listed replication destination nodes (in step S204 in FIG. 6).

As a variation example this example, it may be so arranged that replication destinations of data are determined previously, corresponding to each group. Then, when creating one or more replicas of the data, one of the storage nodes that has received the PUT instruction of the data from the client 2 may issue the replication instruction to an adjacent one of the storage node corresponding to the group to which the storage node on the hash ring belongs. Then, it may be checked whether or not the number of one or more replication destination storage nodes has reached the number of data replicas specified corresponding to the belonging group. When it is determined that the number of the one or more replication destination storage nodes has not reached the number of data replicas specified corresponding to the belonging group, the replication instruction may be further issued to an adjacent one of the nodes on the hash ring corresponding to the belonging group. When it is determined that the number of the one or more replication destination storage nodes has reached the number of data replicas specified corresponding to the belonging group, the replication process is finished.

Even if the number of the operating nodes is reduced (the nodes are stopped) in order to save power in this example, replication of a large volume of data is not necessary. By replicating data corresponding to the number of replicas specified for each of all the groups to which the storage nodes on the hash ring belong, occurrence of replication of a large volume of data is suppressed at a time of group switching when the operating state of the system is switched. Depending on the case, the need for data replication is eliminated.

The following describes the change over from state A to state C in Table 1, when the number of the operating nodes is reduced (the nodes are stopped), for the sake of power saving. As 900 nodes to be stopped at a time of changing over from state A to state C, predetermined nodes are stopped. Then, replication is performed to ensure at least two replicas are held in the group C. For this reason, when state A is changed over to state C, it is ensured that the replicas are present in two of the 100 nodes in the group C. When every 10 nodes of the 1000 nodes mapped on the hash ring in state A are decimated to state C, for example, data to be held in the first storage node 10 (if it is included in the group C) is stored in the node 10 and a node 20. When transition is made from state A to state C, the storage nodes 11 to 19 (storage nodes 21 to 29, 31 to 39, 41 to 49, and so on) are stopped. It is ensured that replicas of data to be put in the storage node 13 in state A, for example, are held in the storage node 20 and a node 30 in state C (that is, first data (primary data) to be held in the storage nodes 11 to 19 in state A is all stored in the storage nodes 20 and 30 to ensure two data are put when the distributed storage system operates in state C).

Even if a fault node has been removed in this example due to occurrence of a node fault or the like, replication of a large volume is not necessary. The node fault is detected by an arbitrary method. The node fault is notified to one of the nodes (adjacent node on the hash ring in the method in Non-patent Document 3) having data held by the node in which the fault has occurred. Then, replication of the data corresponding to reduction in the number of redundancies of the data due to the node fault is further performed to one or more of the nodes that are adjacent to each other. Fault tolerance of data will be described below, using a comparative example and this example.

<Fault Tolerance of Data: Comparative Example 1>

In the case of a consistent hashing method (not involving data replication), simple removal of a node is possible. However, data is not fault tolerant. When each storage node stores data in a cache for use, a database or the like with master data stored therein is provided. The data can be obtained again by accessing a master data base including the master data. Accordingly, node removal does not necessarily lead to a data fault in a system as a whole, For restoration from the fault, the master database is accessed to PUT the data held by the removed node in the storage node again, by consistent hashing. The data held by the storage node, corresponding to the cache is obtained by switching to the access to the master database. Thus, a load on the master database increases.

<Fault Tolerance of Data: Comparative Example 2>

In the case of a consistent hashing method involving replication, described in Non-patent Document 3 or the like, data is fault tolerant. However, when a large number of nodes are simultaneously removed, data may be lost. That is, when one or more node faults have occurred and the number of one or more fault nodes is less than the number of redundancies of data, a client can continuously access the data without taking any action. However, the number of redundancies of a part of the data held by the one or more fault nodes is reduced. For this reason, a restoration process of restoring the number of redundancies to the original state is needed. In the restoration process in which the number of the data redundancies is restored to the original state, a node fault is detected, data replication is instructed to a storage node holding with redundancy the data held by the node in which the fault has occurred, and then the data is replicated in an adjacent storage node on a hash ring.

<Fault Tolerance of Data: In the Present Invention>

According to the present invention, fault tolerance of data is provided. Data is not lost at a time of a node fault when the nodes are stopped simultaneously according to a rule defined beforehand. Assume, however, that node removal is not performed according to the rule defined beforehand, but that a large number of the storage nodes are selected to be simultaneously removed at random, for example. Then, data may be lost. In this example as well, a process of restoring the number of data redundancies is performed when a node fault occurs. When the node fault is detected, it is checked whether or not data held by the storage node in which the fault has occurred satisfies a requirement of the number of data replicas (number of redundancies) specified for each belonging group of the storage node. The node which performs this check process may be an arbitrary one of the nodes on the ring.

When there is even one group to which the storage node belongs that does not satisfy the requirement of the number of data replicas (number of redundancies) specified for each group, one or more replication destination storage nodes are calculated so that the requirement of the number of data replicas (number of redundancies) is satisfied. This calculation procedure is performed in a similar manner to that in the flowchart in FIG. 7.

When the one or more replication destination storage nodes (list of the replication destination nodes) are determined, an instruction instructing to perform data replication for the one or more replication destination nodes is transmitted to one of the storage nodes holding the data to be replicated. According to this example, the number of data replicas is specified for each group, and it is checked whether or not data replicas are present corresponding to the number of replicas specified for the group. When the number of the data replicas runs short, replication is performed. For this reason, in case changing over of the operating state (group) is performed even when a node is fault, fault tolerance of data is ensured.

INDUSTRIAL APPLICABILITY

The present invention can be applied to an application such as a distributed storage system or a distributed cache system. The present invention can also be applied to an application such a computer system using these systems.

Each disclosure of the Non-patent Documents described above is herein incorporated by reference. Modifications and adjustments of the exemplary embodiment and the example are possible within the scope of the overall disclosure (including claims) of the present invention, and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

What is claimed is:

1. A distributed storage system, comprising:
   a plurality of storage nodes; and
   an operating state specifying unit configured to divide the plurality of storage nodes in the distributed storage system into a plurality of groups corresponding to a selected operating state of the distributed storage system,
   wherein each of the storage nodes is computer-implemented and comprises:
      a storage unit that includes information on a group of said each of the storage nodes and a number of data replicas for each group;
      a processor that runs a program stored in a memory to provide the storage node;
      an access node calculation unit configured to perform a process comprising:
         obtaining one of the storage nodes that is adjacent to a current storage node of the storage nodes on a hash ring having the storage nodes logically arranged thereon, responsive to a data write request;
         identifying, with reference to the storage unit, a group to which an adjacent storage node belongs, and registering the adjacent storage node to a replication destination node list for the group, in case a number of replication destination storage nodes for the group to which the adjacent storage node belongs does not reach the number of data replicas specified for the group stored in the storage unit; and repeating to obtain a next adjacent storage node on the hash ring and register the next adjacent storage node to the replication destination node list for the group, until the number of the replication destination storage nodes for each of the entire groups to which the storage nodes on the hash ring belong reaches the specified number of data replicas; and a replication instruction issuing unit configured to the process, to issue a replication instruction to one or more storage nodes included in the replication destination node list.

2. The distributed storage system according to claim 1, wherein the operating state specifying unit is configured to determine the number of data replicas in correspondence with each of the groups, wherein the access node calculation unit is configured to traverse hash ring having the storage nodes logically arranged thereon, and issues a replication instruction to an adjacent storage node on the hash ring corresponding to the group, wherein the access node calculation unit is configured to check whether or not the number of one or more storage nodes of the replication destinations reaches the number of data replicas specified in correspondence with the group, and wherein the replication instruction issuing unit is configured to issue the replication instruction to a further adjacent storage node corresponding to the group on the hash ring, in case the number of the one or more storage nodes of the replication destinations does not reach the number of data replicas specified in correspondence with the group, and finish a replication process, in case the number of the one or more storage nodes of the replication destinations reaches the number of data replicas specified in correspondence with the group.

3. A distributed storage system, comprising:

a plurality of storage nodes;

an operating state specifying unit configured to divide the plurality of storage nodes in the distributed storage system into a plurality of groups corresponding to a selected operating state of the distributed storage system, wherein each of the storage nodes is computer-implemented and comprises:
  a storage unit that includes information on a group of said each of the storage nodes and a number of data replicas for each group; and
  a processor that runs a program stored in a memory to provide the storage node including:
    an access node calculation unit configured to perform a process comprising:
      (a) obtaining one of the storage nodes that is adjacent to a current one of the storage nodes on a hash ring having the storage nodes logically arranged thereon, the storage node receiving a data write request from a client being initially set as a current storage node;
      (b) identifying a group to which the obtained adjacent storage node belongs, and comparing the number of data replicas specified in correspondence with the group to which the obtained adjacent storage node belongs with the number of nodes included in a replication destination node list that comprises a list of one or more replication destination storage nodes;
      (c) setting the adjacent storage node to a current storage node, in case a number of the one or more replication destination storage nodes for the group to which the adjacent storage node belongs reaches the specified number of data replicas, and returning to the process (a) that obtains an adjacent storage node on the hash ring;
      (d) adding the adjacent storage node obtained in the process (a) to the replication destination node list, in case the number of replication destination storage nodes for the group to which the adjacent storage node belongs does not reach the specified number of data replicas;
      (e) determining whether the number of replication destination storage nodes for each of the entire groups to which the storage nodes on the hash ring belong reaches the specified number of data replicas;
      (f) setting the adjacent storage node to a current storage node and returning to the process (a) that obtains an adjacent storage node on the hash ring, in case it is determined as a result of the determination that the number of replication destination storage nodes for each of the entire groups to which the storage nodes on the hash ring belong does not reach the specified number of data replicas; and
      (g) sending the replication destination node list to a replication instruction issuing unit, in case it is determined as a result of the determination that the number of the replication destination storage nodes for each of the entire groups to which the storage nodes on the hash ring belong reaches the specified number of data replicas; and
    the replication instruction issuing unit configured to issue a replication instruction to the one or more storage nodes included in the replication destination node list.

4. A method for data storage in a distributed storage system including a plurality of storage nodes, wherein the plurality of storage nodes are divided into a plurality of groups corresponding to a selected operating state of the distributed storage system, each of the storage nodes being computer-implemented and comprising a storage unit that includes information on a group of said each of the storage nodes and a number of data replicas for each group, and a processor that runs a program stored in a memory, the method comprising:

obtaining, by the processor of the storage node, one of the storage nodes that is adjacent to a current storage node of the storage nodes on a hash ring having the storage nodes logically arranged thereon, responsive to a data write request;

identifying, by the storage node, with reference to the storage unit, the group to which the obtained adjacent storage node belongs, and registering the adjacent storage node to a replication destination node list prepared for the group, in case a number of replication destination storage nodes for the group to which the adjacent storage node belongs does not reach the number of data replicas for the group stored in the storage unit;

repeating to obtain, by the processor of the storage node, a next adjacent storage node on the hash ring and to register the next adjacent storage node to the replication destination node list for the group, until the number of the replication destination storage nodes for each of the entire groups to which the storage nodes on the hash ring belong reaches the specified number of data replicas; and issuing, by the processor of the storage node, a replication instruction to the one or more storage nodes included in the replication destination node list.

5. The method according to claim 4, comprising:
determining, by the processor of the storage node, one or more replication destinations of data corresponding to each of the groups;
traversing, by the processor of the storage node, a hash ring having the storage nodes logically arranged thereon, and issuing a replication instruction to an adjacent one of the storage nodes on the hash ring corresponding to the group, when creating the one or more data replicas:,
checking, by the processor of the storage node, whether or not a number of one or more of the storage nodes of the replication destinations reaches the number of data replicas specified in correspondence with the group; and
issuing, by the processor of the storage node, the replication instruction to a further adjacent one of the storage nodes on the hash ring corresponding to the group, in case the number of the one or more storage nodes of the replication destinations does not reach the number of data replicas specified in correspondence with the group, and
finishing, by the processor of the storage node, a replication process, in case the number of the one or more storage nodes of the one of more replication destinations reaches the number of data replicas specified in correspondence with the group.

6. A method for a data storage adapted to be arranged in a distributed storage system including a plurality of the storage nodes, wherein the plurality of storage nodes are divided into a plurality of groups corresponding to a selected operating state of the distributed storage system, each of the storage nodes being computer-implemented and comprising a storage unit that includes information on a group of said each of the storage nodes and a number of data replicas for each group, and a processor that runs a program stored in a memory, the method comprising, when creating, by the processor of the storage node, one or more data replicas:
(a) obtaining one of the storage nodes that is adjacent to a current one of the storage nodes on a hash ring having the storage nodes logically arranged thereon, the storage node receiving a data write request from a client being initially set as a current storage node;
(b) identifying the group to which the obtained adjacent storage node belongs, and comparing the number of data replicas specified in correspondence with the group to which the obtained adjacent storage node belongs with the number of nodes included in a replication destination node list that comprises a list of one or more replication destination storage nodes;
(c) setting the adjacent storage node to the current storage node, in case the number of the one or more replication destination storage nodes for the group to which the adjacent storage node belongs reaches the specified number of data replicas, and returning to the process (a) that obtains an adjacent storage node on the hash ring;
(d) adding the adjacent storage node obtained in the process (a) to the replication destination node list, in case the number of replication destination storage nodes for the group to which the adjacent storage node belongs does not reach the specified number of data replicas;
(e) determining whether the number of replication destination storage nodes for each of the entire groups to which the storage nodes on the hash ring belong reaches the specified number of data replicas;

(f) setting the adjacent storage node to a current storage node and returning to the process (a) that obtains an adjacent storage node on the hash ring, in case it is determined as a result of the determination that the number of replication destination stone nodes for each of the entire groups to which the storage nodes on the hash ring belong does not reach the specified number of replicas;
(g) sending the replication destination node list to a replication instruction issuing unit, in case it is determined as a result of the determination that the number of the replication destination storage nodes for each of the entire groups to which the storage nodes on the hash ring belong reaches the number of replicas that is necessary; and
(h) the replication instruction issuing unit issuing a replication instruction to the one or more storage odes included in the replication destination node list.

7. A non-transitory computer-readable storage medium storing a program for causing for causing a processer of a storage node adapted to be arranged in a distributed storage system including a plurality of the storage nodes, wherein the plurality of the storage nodes are divided into a plurality of groups corresponding to a selected operating state of the distributed storage system, wherein the storage node includes:
a storage unit that includes information on a group of said each of the storage nodes and the number of data replicas for each group; and
a processor, to execute a process comprising:
obtaining one of the storage nodes that is adjacent to a current storage node of the storage nodes on a hash ring having the storage nodes logically arranged thereon, responsive to a data write request;
identifying with reference to the storage unit the group to which the obtained adjacent storage node belongs, and registering the adjacent storage node to a replication destination node list prepared for the group, in case the number of replication destination storage nodes for the group to which the adjacent storage node belongs does not reach the number of data replicas for the group stored in the storage unit;
repeating to obtain a next adjacent storage node on the hash ring and register the next adjacent storage node to the replication destination node list for the group, until the number of the replication destination storage nodes for each of the entire groups to which the storage nodes on the hash ring belong reaches the specified number of data replicas; and
issuing a replication instruction to the one or more storage nodes included in the replication destination node list.

8. A non-transitory computer-readable storage medium for causing a processer of a storage node adapted to be arranged in a distributed storage system including a plurality of the storage nodes, wherein the plurality of the storage nodes are divided into a plurality of groups corresponding to a selected operating state of the distributed storage system, wherein the storage node that includes a storage unit that includes information on a group of said each of the storage nodes and the number of data replicas for each group; and the processor, to execute an access node calculation process comprising:
(a) obtaining one of the storage nodes that is adjacent to a current one of the storage nodes on a hash ring having the storage nodes logically arranged thereon, the storage node receiving a data write request from a client being initially set as the current storage node;
(b) identifying the group to which the obtained adjacent storage node belongs, and comparing the number of data replicas specified in correspondence with the group to which the obtained adjacent storage node belongs with the number of nodes included in a replication destination node list that comprises a list of one or more replication destination storage nodes;

(c) setting the adjacent storage node to a current storage node, in case the number of the one or more replication destination storage nodes for the group to which the adjacent storage node belongs reaches the specified number of data replicas, and returning to the process (a) that obtains an adjacent storage node on the hash ring;

(d) adding the adjacent storage node obtained in the process (a) to the replication destination node list, in case the number of replication destination storage nodes for the group to which the adjacent storage node belongs does not reach the specified number of data replicas;

(e) determining whether the number of replication destination storage nodes for each of the entire groups to which the storage nodes on the hash ring belong reaches the specified number of data replicas;

(f) setting the adjacent storage node to a current storage node and returning to the process (a) that obtains an adjacent storage node on the hash ring, in case it is determined as a result of the determination that the number of replication destination storage nodes for each of the entire groups to which the storage nodes on the hash ring belong does not reach the specified number of data replicas;

(g) sending the replication destination node list to a replication instruction issuing process, in case it is determined as a result of the determination that the number of the replication destination storage nodes for each of the entire groups to which the storage nodes on the hash ring belong reaches the specified number of data replicas; and the replication instruction issuing process that issues a replication instruction to the one or more storage nodes included in the replication destination node list.

9. The non-transitory computer-readable storage medium according to claim 7, storing a program for causing the processor to execute the process comprising:

determining the one or more replication destinations of data corresponding to each of the groups;

traversing a hash ring having the storage nodes logically arranged thereon issuing a replication instruction to an adjacent one of the storage nodes on the hash ring corresponding to the group;

checking whether or not a number of one or more of the storage nodes of the replication destinations reaches the number of data replicas specified in correspondence with the group; and issuing a replication instruction to a further adjacent one of the storage nodes on the hash ring corresponding to the group in case the number of the one or more storage nodes of the replication destinations has not attained the number of data replicas specified in correspondence with the group, and finishing a replication process in case the number of the one or more storage nodes of the replication destinations has attain the number of data replicas specified in correspondence with the group.

10. A storage node, wherein the storage unit is adapted to be arranged in a distributed storage system including a plurality of the storage nodes, wherein the plurality of the storage nodes are divided into a plurality of groups corresponding to a selected operating state of the distributed storage system, wherein the storage nodes is computer-implemented and comprises:

a storage unit that includes information on a group of said each of the storage nodes and the number of data replicas for each group;

a processor that runs a program stored in a memory to provide the storage node including:

an access node calculation unit configured to performs the process comprising:

(a) obtaining one of the storage nodes that is adjacent to a current one of the storage nodes on a hash ring having the storage nodes logically arranged thereon, the storage node receiving a data write request from a client being initially set as the current node;

(b) identifying the group to which the obtained adjacent storage node belongs, and comparing the number of data replicas specified in correspondence with the group to which the obtained adjacent storage node belongs with the number of nodes included in a replication destination node list that comprises a list of one or more replication destination storage nodes;

(c) setting the adjacent storage node to a current storage node, in case the number of the one or more replication destination storage nodes for the group to which the adjacent storage node belongs reaches the specified number of data replicas, and returning to the process (a) that obtains an adjacent storage node on the hash ring;

(d) adding the adjacent storage node obtained in the process (a) to the replication destination node list, in case the number of replication destination storage nodes for the group to which the adjacent storage node belongs does not reach the specified number of data replicas;

(e) determining whether the number of replication destination stoup nodes for each of the entire groups to which the storage nodes on the hash ring belong reaches the specified number of data replicas;

(f) setting the adjacent storage node to a current storage node and returning to the process (a) that obtains an adjacent storage node on the hash ring, in case it is determined as a result of the determination that the number of replication destination storage nodes for each of the entire groups to which the storage nodes on the hash ring belong does not reach the specified number of data replicas; and (g) sending the replication destination node list to a replication instruction issuing unit, in case it is determined as a result of the determination that the number of the replication destination storage nodes for each of the entire groups to which the storage nodes on the hash ring belong reaches the number of replicas that is necessary; and the replication instruction issuing unit that issues a replication instruction to the one or more storage nodes included in the replication destination node list.

11. A storage node arranged in a distributed storage system including a plurality of the storage nodes, wherein the plurality of the storage nodes are divided into a plurality of groups corresponding to a selected operating state of the distributed storage system, wherein the storage nodes is computer-implemented and comprises:

a storage unit that includes information on a group of said each of the storage nodes and the number of data replicas for each group; and a processor that runs a program stored in a memory to provide the storage node including:

an access node calculation unit configured to perform the process comprising:
  obtaining one of the storage nodes that is adjacent to a current storage node of the storage nodes on a hash ring having the storage nodes logically arranged thereon, responsive to a data write request;
  identifying with reference to the storage unit the group to which the obtained adjacent storage node belongs, and registering the adjacent storage node to a replication destination node list prepared for the group, in case the number of replication destination storage nodes for the group to which the adjacent storage node belongs does not reach the number of data replicas for the group stored in the storage unit; and
  repeating to obtain a next adjacent storage node on the hash ring and register the next adjacent storage node to the replication destination node list for the group, until the number of the replication destination storage nodes for each of the entire groups to which the storage nodes on the hash ring belong reaches the specified number of data replicas; and
a replication instruction issuing unit configured to issues a replication instruction to the one or more storage nodes included in the replication destination node list.

* * * * *